2,765,311
Patented Oct. 2, 1956

2,765,311

DEHYDROGENATION OF PIPERIDINE TO PYRIDINE

Sydney Horrobin, Blackley, Manchester, and Richard John Young, Hartburn, Stockton-on-Tees, England, assignors to Imperial Chemical Industries Limited, a corporation of Great Britain No Drawing. Application June 16, 1954,
Serial No. 437,277

Claims priority, application Great Britain June 19, 1953

10 Claims. (Cl. 260—290)

This invention relates to catalytic dehydrogenation of piperidine.

It is already known that the dehydrogenation of piperidine can be effected in the vapour phase by treatment with hydrogen in the presence of a platinum or palladium catalyst. However in such a process catalysts based upon metals of the platinum group have hitherto all proved to be extremely sensitive to poisoning so that their activity rapidly subsides.

We have now found that a particular form of platinum or palladium catalyst is outstandingly free from this serious disadvantage.

According to the present invention we provide a process for the catalytic dehydrogenation of piperidine to pyridine by passing piperidine vapour and hydrogen over a platinum or palladium catalyst characterised in that the catalyst is supported on silica gel.

The preparation of the catalyst to be used in the process of our invention may be performed in the manner already described in the prior art or in any other convenient manner. Thus the silica gel may be prepared by treating silica with dilute hydrochloric acid and washing and drying the gelatinous precipitate. Introduction of the platinum or palladium may be effected by impregnation of the silica gel with platinum or palladium chloride, for example by soaking the gel in a solution thereof in hydrochloric acid, and reducing the chloride to the metal by means of hydrogen or formaldehyde and caustic soda.

The amount of platinum or palladium introduced into the silica gel is conveniently from 1% to 10% of the weight of the gel.

The process of the invention is performed at elevated temperatures of from 200° C. to 500° C. and preferably from 300° C. to 400° C.

In order to obtain maximum conversion of piperidine to pyridine with a minimum production of condensation products, and maximum catalyst life, the proportion of hydrogen in the gaseous mixture passed over the catalyst should be high, preferably at least 7 molecular proportions of hydrogen to 1 molecular proportion of piperidine vapour. When lower proportions of hydrogen are used, increased quantities of high boiling byproducts are formed, and the catalyst is more rapidly poisoned. The proportion may with advantage be increased to 10 or more. The hydrogen issuing from the product condensers may be recycled.

By the use of the catalysts of this invention, piperidine can be dehydrogenated to pyridine with high conversion and high yield. The catalyst can be used for long periods without becoming poisoned. It can be readily regenerated as necessary by interrupting the flow of hydrogen and piperidine vapour, sweeping out with nitrogen or other inert gas, and passing air through, with the furnace temperature unchanged, until the rapid evolution of carbon dioxide ceases, and the temperature of the catalyst falls again to that of the furnace.

The invention is illustrated but not limited by the following examples in which parts and percentages are by weight.

Example 1

Silica gel, prepared from sodium silicate and hydrochloric acid, is extruded into pellets, and dried. 120 parts of the silica pellets are treated with a solution of an amount of hydrated palladium chloride equivalent to 6 parts of palladium in 15 parts of concentrated hydrochloric acid and sufficient water to ensure that whilst the whole solution is soaked up by the silica gel, the gel is fully saturated. The solution is dried at 120° C. and cooled. It is heated to 100° C. under nitrogen and heating is continued whilst hydrogen in increasing proportion is admitted to the stream of nitrogen passing through the mass. It is finally treated with pure hydrogen at 300° C. for 5 hours.

12 parts of silica gel containing 5% palladium are placed in a Pyrex glass tube surrounded by an electrically heated furnace. Hydrogen is passed through the tube at the rate of 0.18 to 0.27 part per hour whilst the temperature is raised to 350° C. After half an hour at this temperature, the hydrogen flow rate is increased to 1.6 parts per hour and piperidine vapour, generated by dropping piperidine at the rate of approximately 6 parts per hour into an upper portion of the tube held at approximately 130° C. is introduced. The product is collected in cooled receivers.

After 2 days the product contains only a trace of piperidine and the yield of pyridine is 96% of theory calculated on the piperidine consumed. Approximately 1% of high boiling residues are formed.

During a third day the conversion of piperidine is 98.5% and the pyridine yield is 98%. During a fourth day, the conversion has fallen to 79%, the pyridine yield remaining at 98% (of the piperidine converted).

The catalyst is regenerated by shutting off the hydrogen and piperidine supplies, sweeping out with nitrogen, and passing air through the catalyst tube for 1 hour, with the furnace temperature held at 350° C. During this treatment the temperature of the catalyst mass rises for a short period to approximately 450° C. After sweeping out with nitrogen, and treating with hydrogen for half an hour at 350° C., the hydrogen and piperidine flow rates are restored to their former values. The performance in successive days is then as shown in the table:

| Day | Percent Piperidine Converted | Percent Pyridine Yield |
|---|---|---|
| 1 | 100 | 95 |
| 2 | 97 | 96 |
| 3 | 89 | 94 |
| 4 | 75 | 91.5 |

The catalyst is then regenerated as before.

The regeneration treatment may, if preferred, be carried out at an earlier stage in the cycle, so that the product never contains more than a small amount of piperidine.

Example 2

A catalyst containing 5% platinum on silica gel is prepared by the method described in Example 1.

12 parts of the catalyst, in the apparatus as for Example 1, are treated with hydrogen whilst the temperature is raised to 350° C. and thereafter for half an hour at this temperature. The hydrogen flow rate is raised to 1.6 parts per hour, and piperidine vapour, at the rate of 6 parts per hour, is introduced. The results are shown in the table:

| Day | Percent Piperidine Converted | Percent Yield of Pyridine |
|---|---|---|
| 1 | 96.5 | 85 |
| 2 | 81.5 | 82 |
| 3 | 74 | 82 |

*Example 3*

A catalyst containing 5% palladium on silica gel is prepared by the method described in Example 1.

12 parts of this catalyst, in the apparatus as for Example 1, are treated with hydrogen whilst the temperature is raised to 350° C. and thereafter for half an hour at this temperature. The hydrogen flow rate is raised to 0.3 part per hour and piperidine vapour, at the rate of 6 parts per hour, is introduced. The results are shown in the table:

| Hours | Percent Piperidine Converted | Percent Yield of Pyridine |
|---|---|---|
| 0-4 | 96 | 82 |
| 4-24 | 73 | 69 |

What we claim is:

1. Process for the catalytic dehydrogenation of piperidine to pyridine by passing piperidine vapour and hydrogen over a catalyst selected from the group consisting of platinum and palladium characterised in that the catalyst is supported on silica gel.

2. Process for the catalytic dehydrogenation of piperidine to pyridine as claimed in claim 1 wherein the amount of catalyst introduced into the silica gel is from 1% to 10% of the weight of the gel.

3. Process for the catalytic dehydrogenation of piperidine to pyridine as claimed in claim 2 wherein the process is performed at elevated temperatures of from 200° C. to 500° C.

4. Process for the catalytic dehydrogenation of piperidine to pyridine as claimed in claim 3 wherein the proportion of hydrogen in the gaseous mixture passed over the catalyst is at least 7 molecular proportions of hydrogen to one molecular proportion of piperidine vapour.

5. A process according to claim 4, wherein the proportion of hydrogen is at least 10 molecular proportions of hydrogen to one molecular proportion of piperidine vapour.

6. A process according to claim 5, wherein the temperature is from 300 to 400° C.

7. A process according to claim 1, in which the temperature is from 200 to 500° C.

8. A process according to claim 7, in which the temperature is from 300 to 400° C.

9. A process according to claim 1, in which the temperature is from 200 to 500° C. and the proportion of hydrogen in the gaseous mixture passed over the catalyst is at least 7 molecular proportions of hydrogen to one molecular proportion of piperidine vapour.

10. A process according to claim 9, in which there are at least 10 molecular proportions of hydrogen to one molecular proportion of piperidine vapour.

References Cited in the file of this patent

UNITED STATES PATENTS 2,019,883   Wulff _____ Nov. 5, 1935

OTHER REFERENCES

Zelinsky et al.: Ber. 57:669–71 (1924).

Berkman: "Catalysis," pp. 460–61, Reinhold Pub. Corp., N. Y. (1940).